(12) United States Patent
Pudey

(10) Patent No.: X6746
(45) Date of Patent: Sep. 3, 1831

(54) GARMENTS, MARKING OUT & CUTTING

(76) Inventor: John Pudey

John Pudney Waterford New York

Letters Patent

The schedule referred to in these Letters Patent and making part of the same containing a description in the words of the said John Pudney himself of his Improvement being an Instrument for determining the points in marking out & cutting garments called the "American System."

Be it known that I John Pudney of Waterford in the County of Saratoga State of New York have made a new and useful improvement being an Instrument for determining the points in marking out & cutting garments called the American System which is described as follows.

My improvement consists principally in adding to the common square a piece of wood or metal in the form of a segment of a circle and movable tongue piece or delineator marked off or graduated in the manner hereafter described. The square may be twenty four inches long two inches wide and a fourth of an inch thick. The short part of it may be sixteen inches long & the same width and thickness. On both sides is marked a scale of inches half inches and quarter inches. At figure 12 the center of the square is marked the letter A at 12½ B at 13 C and so on to the end of the alphabet denoting different sizes for different persons The Segment of a circle or brace is the segment of a circle about twelve inches in diameter composed of two pieces each an inch wide placed one eighth of an inch apart leaving a space between them for the tongue or delineator and secured to the two sides of the square by screws, or by rivets or other fastenings.

The moveable tongue piece or delineator is made of wood or metal (like the rest of the instrument) twenty three and a quarter inches long three fourths of an inch wide and one sixteenth of an inch thick. It is secured to the inner corner of the square by a screw or pivot on which it turns and moves between the two pieces of the segment of a circle from one side of the square to the other describing a quarter circle; and when set in one fits into a groove on the side of the square. At the end of the tongue is a small nib or projection to lay hold of in removing it from the groove. This tongue piece or delineator has several rows or columns of letters and figures marked on each side for deter-mining the points in marking out a garment to be cut. Lines diverging from the [illegible] corner of the square or centre of the piece on which the moveable tongue piece turns, are marked upon the segment piece with words or figures against each line signifying the use of it. These lines are to denote the position of the tongue piece in determining points and are formed by cutting two garments by one scale for the largest and smallest person or by marking them upon paper or cloth, letting certain points of both touch the square, or corner of the paper or cloth, placing the square upon the corner of the cloth or paper, & moving the tongue to the first point of the garment when the points of both garments will be found to diverge from one centre if marked correctly.

You will then mark upon the segment a line di-verging from a centre to these points, and words or figures against it signifying its use. The tongue being divided into five or more equal parts, you will mark or [illegible] the tongue at the largest and smallest points for garments, and [illegible] letters or figures at each dot or mark for the different sizes between the largest and small-est, in all twenty five or more if necessary. You will proceed in this manner with all the required lines & points for marking garments some upon one side of the segment & tongue piece & the rest upon the other.

The inner edge or concave of the segment answers the purpose of marking the top of the back to body coats, there being a scale or figures or letters to ascertain the width of the back.

There may be two or more moveable tongue pieces or de-lineators with corresponding segment pieces. For a further illustration of my inven-tion I refer to the drawing and model of the same deposited in the Patent office.

What I claim as my invention and which I wish to secure by letters Patent is the above described instrument for determining the points in mar-king out and cutting garments called the "American System". In testimony whereof I have hereunto subscribed my name before two witnesses and made oath to the same

[illegible] this [illegible] day of August 1831

[illegible] Witnesses { W. P. Elliot
Chas Bulfinch Jr }

John [illegible]

Recorded September 8. 1831 [illegible]